April 9, 1968 — E. A. STARON — 3,376,587
FOLDING SEAT AND LOCKER ARRANGEMENT FOR A BOAT HULL
Filed July 21, 1966

INVENTOR.
EDWARD A STARON
BY
Francis J. Klempay
ATTORNEY

United States Patent Office 3,376,587
Patented Apr. 9, 1968

3,376,587
FOLDING SEAT AND LOCKER ARRANGEMENT
FOR A BOAT HULL
Edward A. Staron, 1713 Homewood Ave.,
Youngstown, Ohio 44502
Filed July 21, 1966, Ser. No. 566,793
3 Claims. (Cl. 9—7)

ABSTRACT OF THE DISCLOSURE

A seat is provided immediately forward of the bailing well of a powerboat and is so mounted that it may be secured in any of three positions: horizontally to provide a seat; vertically downward to provide a cover for the compartment beneath the bailing well of the boat; or substantially vertically upward to provide easy access to the compartment.

---

This invention relates to the construction and fitting of powerboats, and has particular application to powerboats of smaller size and more specifically to those types of boats which utilize detachable outboard motors and have some seating facilities. In aquatic equipment of this nature space is always at a premium and considerable difficulty is experienced in providing adequate seating capacity without emasculating the open deck spaces of the vessel and without excessive interference with access to storage compartments of essential gear or of other gear which is desired to be stowed. It is the primary object of the present invention to provide a combined seating and stowing compartment arrangement for smaller vessels which resolves these various conflicting requirements but, nevertheless, is simple and practical in concept, economical to produce, and readily applicable to both existing and newly manufactured vessels.

A secondary object of the invention is to provide in a combination of the above outlined nature of an arrangement whereby a single and simply constructed slab-like component may be practically utilized alternatively as a seat for the bench support of passengers or as a door for a readily accessible stowage compartment of considerable size. Further, when used for the latter purpose the component may serve as a lockable enclosure for the compartment to prevent unauthorized access thereto and also as a means for increasing the usable free space of the deck of the vessel for standing, fishing, and other purposes.

Another object of the invention is to provide an assembly of the general combination and nature outlined above in which the slab-like component referred to may be hinged upwardly beyond its passenger-supporting or generally horizontal position to facilitate access to the stowage compartment which is conveniently placed to the rear of the seat and under the back rest which makes up the rear portion of the bench-like support.

The above and other objects and advantages of the invention will become apparent upon consideration of the following specification and the accompanying drawing wherein there is disclosed a preferred embodiment of the invention. Since the invention is of greater utility in its application to a small open boat of the kind designed for outboard motor propulsion and having incorporated in the hull of the boat a bailing well, the invention will be described as being applied to such a vessel.

Figure 1:
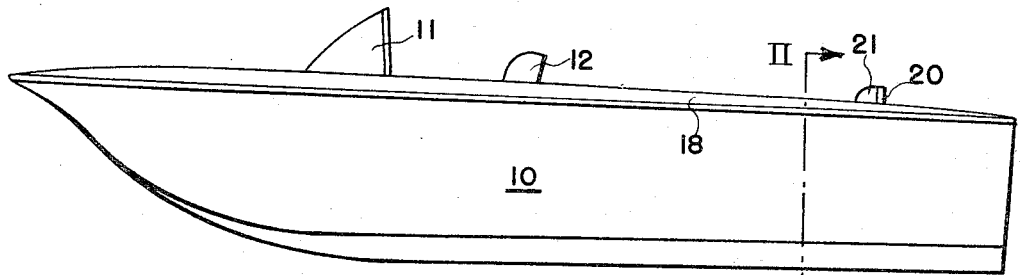
FIGURE 1 is a side elevation of a conventional outboard motorboat to which the invention herein is illustrated as being applied.

In the drawing, reference numeral 10 designates generally the hull assembly of a conventional power boat having a windscreen 11 and a pilot seat 12. Normally, the seat 12 is positioned well forward in the hull to provide behind it considerable open bottom deck area for the installation of additional seating facilities, haulage space or simply an open area for fishing, etc., depending on the preference of the owner and/or user. In the craft for which the present invention is especially intended the stern end of the hull terminates in a transom 13 to which an outboard motor assembly, not shown, is detachably affixed, the transom being cut away in its center portion as shown at 14 to lower the motor assembly into proper position relative to the keel of the craft. Forwardly of the upper portion of the transom 13 is a bailing well having an inclined bottom wall 15 from which water is discharged through apertures 16' formed in the transom 13. Commonly, the space 16 below the wall 15 is utilized as stowage space for gasoline containers, battery boxes, or other gear, and this space is also sometimes enclosed by sliding or hinged doors as will be understood by those familiar with the art.

Figure 3:
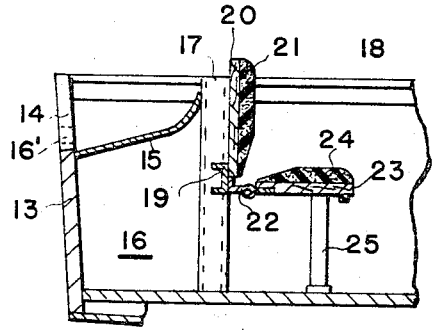
FIGURE 3 is a vertical sectional view taken along the line III—III of FIGURE 2.

As stated initially above, it is the purpose of the present invention to utilize much more advantageously the space immediately ahead of such stowage compartments or compartment 16, and the manner of such use will now be described in detail. Obviously, the features of the invention may be incorporated in the hull structure during its manufacture, in which case some of the structural elements involved may be built into and used as integral parts of the hull structure, but for purposes of the present disclosure I illustrate an assembly which may be readily added to an existing hull structure. Thus, I provide a generally low H-shaped frame consisting of two spaced vertical sections 17 which are fitted immediately within the gunwales 18 of the boat structure and an interconnected horizontal section 19. These sections 17 and 19 are preferably made of lightweight aluminum channels, and as shown in FIGURE 3, the frame assembly is secured in the hull immediately ahead of the bottom member 15 of the aforesaid bailing well. When installing the article of the present invention in an existing hull the above mentioned sliding and/or hinged doors, if used, are removed and discarded.

Figure 4:
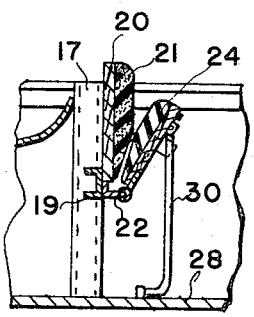
FIGURES 4 and 5 are views like FIGURE 3 but showing the slab-like element of the article of the invention in two useful positions which are alternative to the more commonly used position thereof shown in FIGURES 2 and 3.

Rigidly secured to the upper end portions of the section 17 and preferably overlying at least a portion of the horizontal section 19 is a stiff waterproof board 20 upholstered with a pad 21 and forming the back rest of an elongated bench which extends the full width of the boat hull. Rigidly secured to the lower portion of the horizontal section 19 is a plurality of spaced hinges 22, the inner leaves of which are preferably L-shaped as shown while the outer leaves are flat and rigidly attached to a second waterproof board 23 which is upholstered at 24 on one face to provide a seat for the aforesaid bench. It should be noted particularly, at this stage, that the pivotal axis of the hinges 22 is spaced well forward of the plane of the board 20 so that the seat assembly 23, 24 may be tilted upawrdly a substantial extent as shown in FIGURE 4 without undue interference between the pads 21 and 24 and for a purpose which will be described below.

Hingedly mounted on the reverse or uncovered face of the board 23 are supports or legs 25 designed to be folded out generally normal to the plane of the board 23 to support said board in substantially horizontal position when the assembly is used as a seat, the line of support being out toward the front or free edge of the seat for maximum strength when the seat is fully occupied. While not detailed herein, the hinges for the legs 25 are preferably of the kind which releasably retain the legs substantially normal to the plane of the board 23 so that vibration and other forces will not inadvertently cause the legs to collapse. Also, the legs 25 are so positioned relative to each other that they do not overlap when collapsed and so that they will not interfere with any structural members framing the space 16. In any small boat stowage space is at a premium and it may be desirable to offset forwardly the lower portions of framing members for the space 16, in which case the legs 25 and their hinges could be nested within the openings through the framing structure leading to the space 16.

Figure 2:
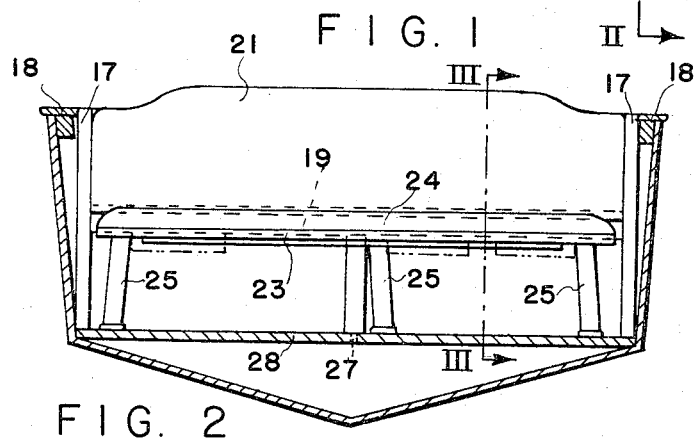
FIGURE 2 is a vertical section of the boat of FIGURE 1 taken along the line II—II and showing the article of the invention in elevation.
Figure 5:
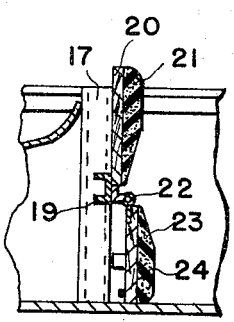
Figure 6:
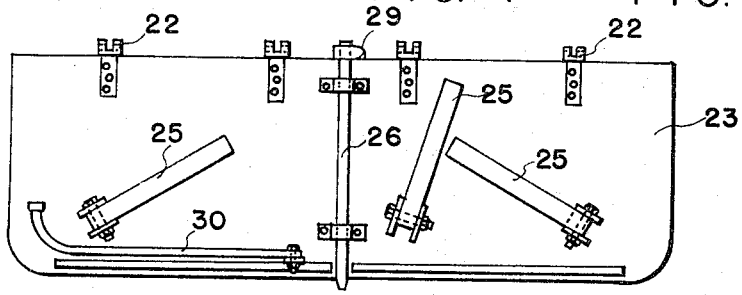
FIGURE 6 is a rear elevational view, on an enlarged scale, of the slab-like element of the article of the invention referred to above.

The front to back dimension of the seat assembly 23, 24 is so related to the height of the pivot points of the hinges 22 that the seat assembly may be folded down vertically as shown in FIGURE 5 to increase the open area of the boat and at the same time to provide a closure for the space 16. Suitable locking means such as the slide bolt 26 may be provided to retain the seat assembly in vertical position, the tapered outer or bottom end of the bolt entering into an aperture 27 (FIG. 2) of the floor 28 of the hull. A key lock shown schematically at 29 (FIG. 6) may be provided to prevent unauthorized withdrawal of the bolt 26 and thus unauthorized entry into the stowage space 16. Completing the assembly of the invention is a prop 30 which is also hinged to the underside of the seat assembly for alternate movements between a position wherein it lies flat against the seatboard 23 and the relative position shown in FIGURE 4 wherein it is vertical and when resting on the floor 28 holds the seat assembly in upwardly tilted position as shown. Again, the hinge structure for the prop 30 is such that the prop is releasably retained in either of these two stated positions.

Considering now the operation and advantages of the apparatus of the invention, it should be apparent that said apparatus provides an improved combined seating facility and stowing compartment which accomplishes the objects initially set out above. Foremost is the fact that very little space is required in the boat for this combined arrangement, and this advantage is quite important in small craft. Secondly, the construction gives much wider and easier access to the stowing compartment 16 in passing in and out fuel and battery containers and other gear, this advantage resulting from the upward tilting of the seat assembly and the absence of any requirement for struts or rails blocking full access to the space 16. Further, the arrangement not only provides a capacious auxiliary seat for passengers but also a lockable closure for the stowing compartment with extremely easy convertibility. Lastly, the arrangement while yet affording substantially increased seating capacity is readily collapsible or foldable to increase the open area of the boat for purposes above mentioned while also affording at the same time a cushioned wall for such area. Obviously, other and/or additional units of the combined apparatus herein disclosed may be incorporated along other stretches of the interior of the boat hull to extend the usefulness of the invention and/or to tailor the details of the boat to the owner's preference. For example, a similar unit may be positioned immediately behind the pilot seat 12 and the usual side companion seat, not shown, with the bench of this invention facing rearwardly and with a step-thru notch in the back rest of the bench. Also, similar units may be positioned along the gunwales of the boat hull.

Having thus described my invention what I claim is:

1. A fitting for a boat of the type normally powered by an outboard motor and having a bailing well immediately forward of the transom of the boat and a compartment below said bailing well, said compartment having a vertically disposed entry opening facing toward a passenger compartment of the boat, comprising in combination: a back rest secured to the frame of the boat, and abutting the forward edge of said bailing well, the lower edge of said back rest being above the upper edge of said opening of said compartment; a plurality of hinges secured by one of their leaves to the lower edge of said back rest and having their pivot points forwardly offset from said back rest; a slab-like seat secured at its rear edge to the other of the leaves of said hinges, said offset hinges allowing said seat to be pivoted from a vertical position closing said compartment, through a horizontal position, to a substantially vertical upward position providing unobstructed access to said compartment; legs secured to the underside of said seat, said legs being arranged to be held in a first position such as to support the seat in a horizontal position and in a second position against the underside of said seat; and means secured to said seat to hold the same in the upward position allowing access to said compartment.

2. A fitting according to claim 1 further characterized in that said seat includes a rigid board-like base, and a locking bolt slideably mounted on said base and adapted to have sliding interconnection with a keeping means affixed to the hull structure of the boat whereby said seat may be releasably locked in position for closing off said compartment.

3. A fitting according to claim 1 further including a vertically disposed mounting frame for said back rest and seat and positioned substantially in the plane of said entry opening into said compartment, said frame having vertically disposed structural sections positioned immediately inward from the gunwales of the boat hull and extending to the floor of said compartment, and said frame also having a horizontally disposed structural section affixed to said first mentioned sections intermediate the top and bottom ends thereof, said back rest having a vertically disposed board-like base resting against portions of said sections, and the hinges for said seat being affixed to said horizontally disposed structural section.

References Cited

UNITED STATES PATENTS

| | | | |
|---|---|---|---|
| 1,079,729 | 11/1913 | Stofel | 9—7 |
| 2,472,185 | 6/1949 | Apel | 9—7 |

FERGUS S. MIDDLETON, *Primary Examiner.*

MILTON BUCHLER, *Examiner.*

R. A. DORNON, *Assistant Examiner.*